United States Patent
Chen et al.

(10) Patent No.: US 7,325,072 B2
(45) Date of Patent: Jan. 29, 2008

(54) INTER-SUBNET MULTICAST RELAYING SERVICE-A NETWORK INFRASTRUCTURE INDEPENDENT SOLUTION TO CROSS SUBNET MULTICASTING

(75) Inventors: Shiwen Chen, Marlboro, NJ (US); Hongbing Li, Belle Mead, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 907 days.

(21) Appl. No.: 10/445,383

(22) Filed: May 23, 2003

(65) Prior Publication Data

US 2005/0021802 A1    Jan. 27, 2005

(51) Int. Cl.
*G06F 15/173* (2006.01)
*H04L 12/66* (2006.01)

(52) U.S. Cl. .................. 709/238; 709/231; 370/390; 370/401

(58) Field of Classification Search ............ 709/227, 709/217, 238, 231; 370/352, 342, 390, 401
See application file for complete search history.

(56) References Cited

U.S. PATENT DOCUMENTS

| | | | | |
|---|---|---|---|---|
| 2002/0073167 A1* | 6/2002 | Powell et al. | ............... | 709/217 |
| 2003/0202506 A1* | 10/2003 | Perkins et al. | ............. | 370/352 |
| 2004/0184427 A1* | 9/2004 | Lynch et al. | ............... | 370/342 |
| 2004/0221042 A1* | 11/2004 | Meier | ........................ | 709/227 |

OTHER PUBLICATIONS

Dutt et al, "MarconiNet supporting Streaming Media over Localized Wireless Multicast", Sep. 2002.*

* cited by examiner

*Primary Examiner*—Jungwon Chang
(74) *Attorney, Agent, or Firm*—Harness, Dickey & Pierce, PLC (57) ABSTRACT

A multicast relay system for use in a wide area network, includes an input receptive of multicast data specifying a multicast channel having a multicast address. A proxy election module is adapted to elect a multicasting server proxy disposed within a subnet associated in memory with the multicast channel, wherein the multicasting server proxy is adapted to receive the multicast data and multicast the multicast data on the multicast address within the subnet. A multicast data relay module is adapted to transmit the multicast data to the multicasting server proxy.

27 Claims, 7 Drawing Sheets

INTER-SUBNET MULTICAST RELAYING SERVICE-A NETWORK INFRASTRUCTURE INDEPENDENT SOLUTION TO CROSS SUBNET MULTICASTING

FIELD OF THE INVENTION

The present invention generally relates to multicasting systems and methods, and particularly relates to cross-subnet multicasting in wide area networks.

BACKGROUND OF THE INVENTION

The task of multicasting multicast data between subnets of a Wide Area Network (WAN) such as the Internet is often complicated by non-heterogeneity between subnets of the WAN; for purposes herein, a subnet is generally defined as a multicast zone within which any station can multicast data to any other station within the same zone. For example, subnet implementers and/or administrators must incur some expense and/or go to some effort to render a subnet multicast friendly by configuring routers and/or centralized network control to provide multicasting pass-through service. Also, providing multicasting pass-through service in a subnet constitutes a substantial security risk that is incompatible with various security solution protocols often implemented in secure Enterprise networks. Thus, a multicasting server is often able to multicast data on a multicast address inside the particular subnet within which it resides, but is not able to multicast data into an adjacent subnet or distant subnet. In a related fashion, a multicasting receiver is often able to listen at a multicast address for data multicast inside the particular subnet within which it resides, but is not able to receive data multicast from an adjacent or distant subnet. As a result, multicasting is not truly implemented in today's WANs due to varying network infrastructures between subnets.

What is needed is a way to permit a multicasting server residing in a subnet that is not multicasting friendly to multicast data into an adjacent or distant subnet. What is further needed is a way to permit one or more multicasting receivers residing in a subnet that is not multicasting friendly to request and reliably receive multicasting data from a multicasting server residing in an adjacent or distant subnet. The present invention provides a solution that fulfills these needs.

SUMMARY OF THE INVENTION

In accordance with the present invention, a multicast relay system for use in a wide area network includes an input receptive of multicast data specifying a multicast channel having a multicast address. A proxy election module is adapted to elect a multicasting server proxy disposed within a subnet associated in memory with the multicast channel, wherein the multicasting server proxy is adapted to receive the multicast data and multicast the multicast data on the multicast address within the subnet. A multicast data relay module is adapted to transmit the multicast data to the multicasting server proxy.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

By way of overview the present invention provides a solution that fulfills the aforementioned needs by using multicasting server proxies; in particular, the provided solution targets applications where multicast membership is dynamic, and member subnets are many, thereby making it undesirable (cost, network administration and management) to deploy multicast relaying proxies at every candidate site. The proposed solution advantageously requires no setup of fixed proxy servers that is local to each subnet, and is adaptive in regard to dynamic receiving application membership.

Figure 1:
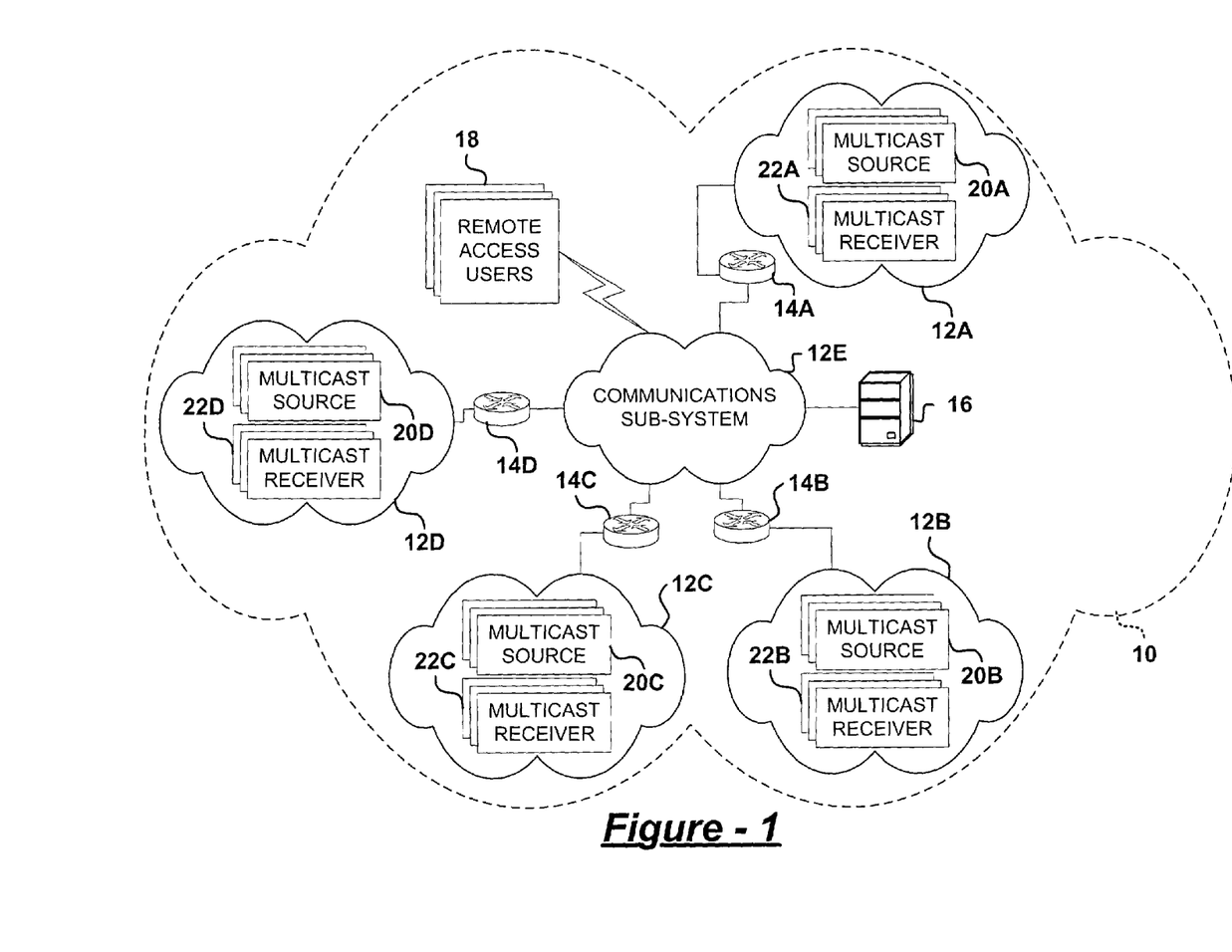
FIG. 1 is a block diagram illustrating an inter-subnet multicasting relay service in accordance with the present invention.

FIG. 1 illustrates an inter-subnet multicasting relay service implemented in a WAN 10 in accordance with the present invention. Wan 10 includes various subnets 12A-12E, that are separated by routers 14A-14D that do not provide multicasting pass-through service. It should be readily understood that subnet 12E may correspond to any communications subnet, and need not necessarily correspond to a subnet as defined with respect to the present invention. Inter-subnet Multicasting Relay Service (IMRS) server 16 is connected to subnet 12E, as are remote access users 18. Various multicast sources 20A-20D and multicast receivers 22A-22D are disposed within subnets 12A-12D adjacent to subnet 12E. In accordance with the present invention, server 16 provides a relay point that essentially relays multicast data from one of multicast sources 20A-20D to one or more of multicast receivers 22A-22D. Server 16 provides this service by receiving a unicast of the multicast data from a multicast source, and by unicasting the multicast data to a multicasting server proxy within each subnet subscribing to the multicasting channel specified by the multicast data, and the multicasting server proxy multicasts the received data on a multicast address within the subnet within which it resides.

Figure 2:
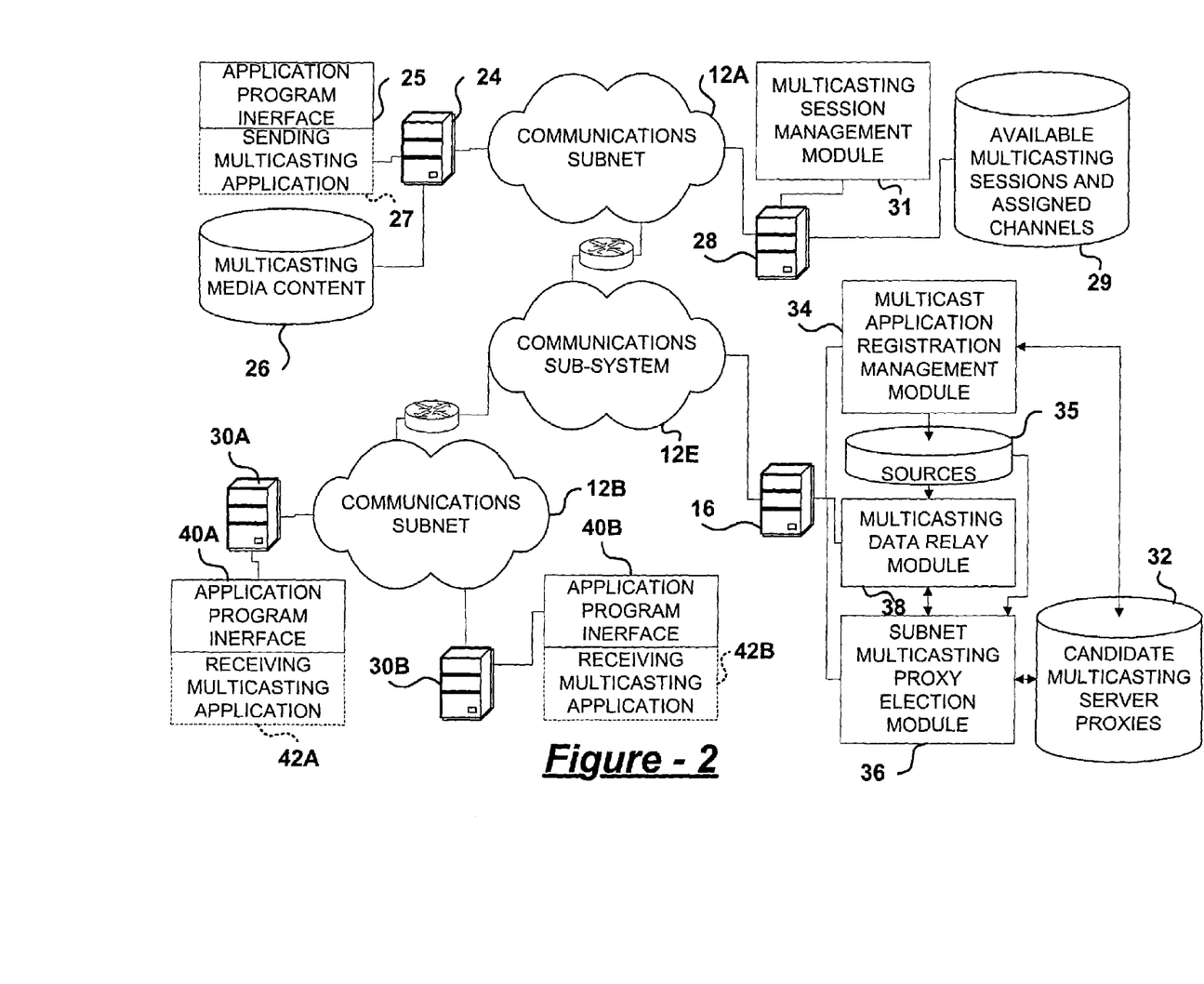
FIG. 2 is a block diagram illustrating components of an inter-subnet multicasting relay service in accordance with the present invention.

FIG. 2 illustrates components of an IMRS system wherein a multicasting server 24 residing within subnet 12A has multicast media content datastore 26 and is adapted by virtue of application program interface 25 to utilize sending multicasting application 27 to multicast data within its own subnet 12A, and to also unicast multicast data to server 16. Interface 25 further causes server 24 to register with server 16 via multicast application registration module 34 as a sending multicasting application in sources datastore 35. Server 24 coordinates with multicasting session management server 28 as known in the art, such that server 28 utilizes multicasting session management module 31 to maintain catalog datastore 29 of available multicasting sessions and assigned multicasting channels. Receiving application hosts 30A and 30B residing in subnet 12B may thus utilize receiving multicasting applications 42A and 42B to access catalog datastore 29 and identify an available multicasting session and assigned multicasting channel. Receiving multicasting applications 42A and 42B each have application program interfaces 40A and 40B, which are adapted to cause applications 42A and 42B to register as candidate multicasting server proxies for subnet 12B with server 16 via multicast application registration module 34. Thus, server 16 may elect one of applications 42A and 42B as the multicasting server proxy for subnet 12B via subnet multicasting proxy election module 36, and relay multicast data received from server 24 to the elected application. Each of interfaces 40A and 40B further enable applications 42A and 42B to simultaneously listen for multicast data at a designated receive queue, and listen at a multicast channel on subnet 12B for multicast data. Each of interfaces 40A and 40B further enable applications 42A and 42B to multicast on the multicast address any data received on a designated receive queue, thereby multicasting the data within subnet 12B. It should be readily understood that server 24 is adapted to unicast the multicast data to server 16 instead of attempting to multicast it to subnet 12B, and that server 16 may obtain this adaptation through a registration process that provides appropriate software components to supply sending multicasting application 27 to server 24 in accordance with one or more business methods. It should also be readily understood that software components providing receiving multicasting applications having the application program interface in accordance with the present invention may be supplied to hosts by a multicasting service and/or a multicasting relay service in accordance with one or more business methods.

Figure 3:
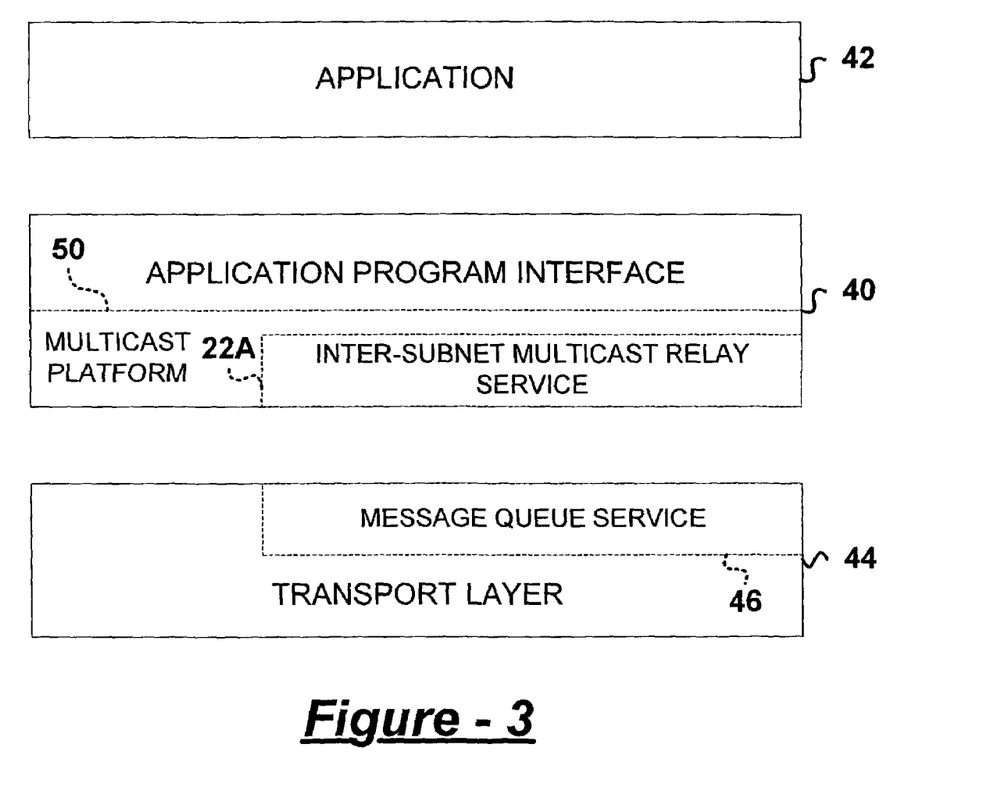
FIG. 3 is a block diagram illustrating an application program interface between a network application layer and a network transport layer in accordance with the present invention.

FIG. 3 illustrates the application program interface 40 between a network application layer 42 and a network transport layer 44 in accordance with the present invention. Therein, the application program interface 40 is adapted to utilize the Message Queue Service (MQS) 46 of the transport layer 44 providing Transmission Control Protocol (TCP), Internet Protocol (IP), and/or User Datagram Protocol (UDP) functions. Essentially, the IMRS 48 within the larger multicast platform 50 interfaces directly with the MQS 44, and therefore can operate within the larger environs of a WAN in accordance with established protocols.

Figure 4:
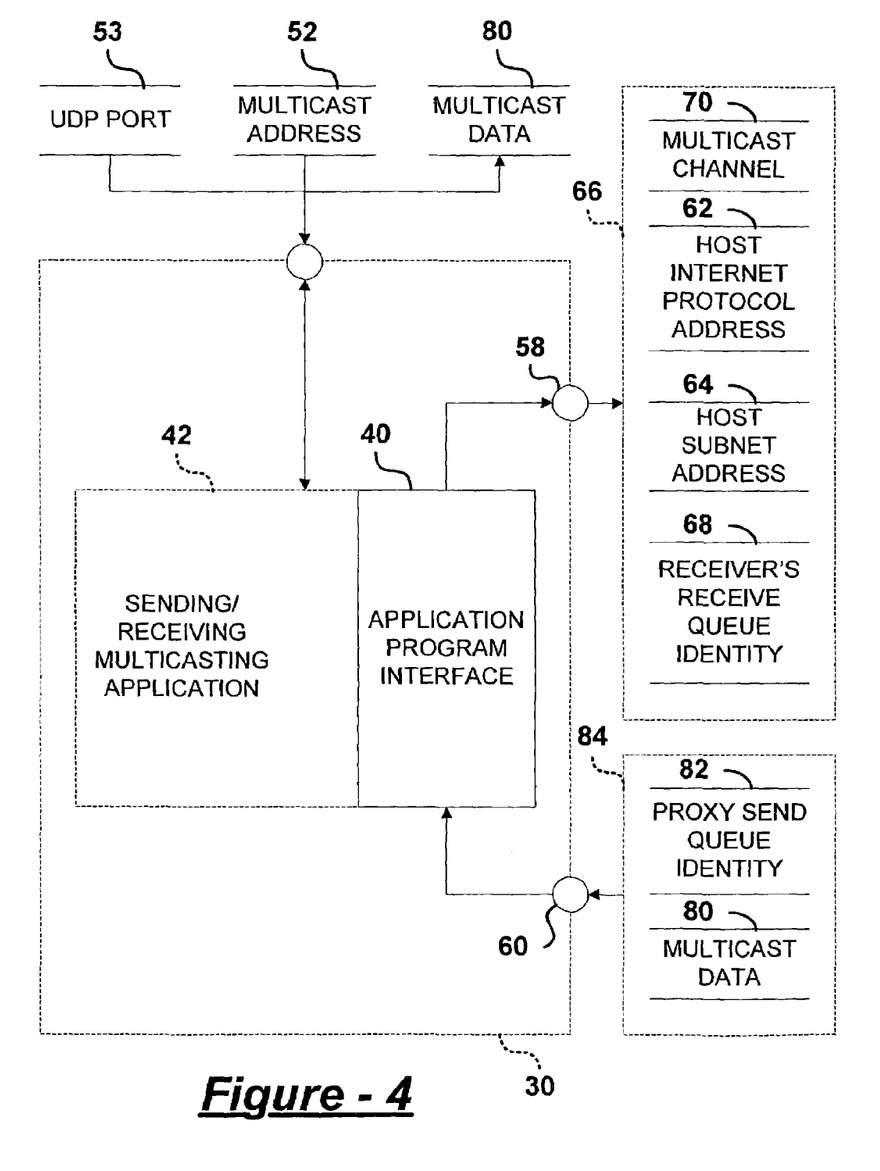
FIG. 4 is a block diagram depicting a multicast receiver implementing an application program interface in accordance with the present invention.

FIG. 4 illustrates operation of the receiving application host 30 implementing the receiving multicasting application 42 having the application program interface 40. The application 42 identifies a multicasting channel assigned to a multicasting session, and the channel information may include multicast address 52 and UDP port 53; it should be noted that multicasting channel may optionally include the source address wherever it is referred to within the meaning of the present invention. Interface 40 opens a designated send queue 58 and receive queue 60, and further obtains relevant host information such as the host IP address 62, and the host subnet address 64. It still further causes application 42 to register itself as a candidate multicasting ser proxy for the subnet within which it resides by communicating a registration request 66 to the IMRS server (not shown). This request 66 includes the receiving application's designated receive queue identity 68, the host IP address 62, the host subnet address 64, and the multicast channel 70, which includes the UDP port number and the multicast address 52 provided by the multicasting session management server (not shown).

Figure 5:
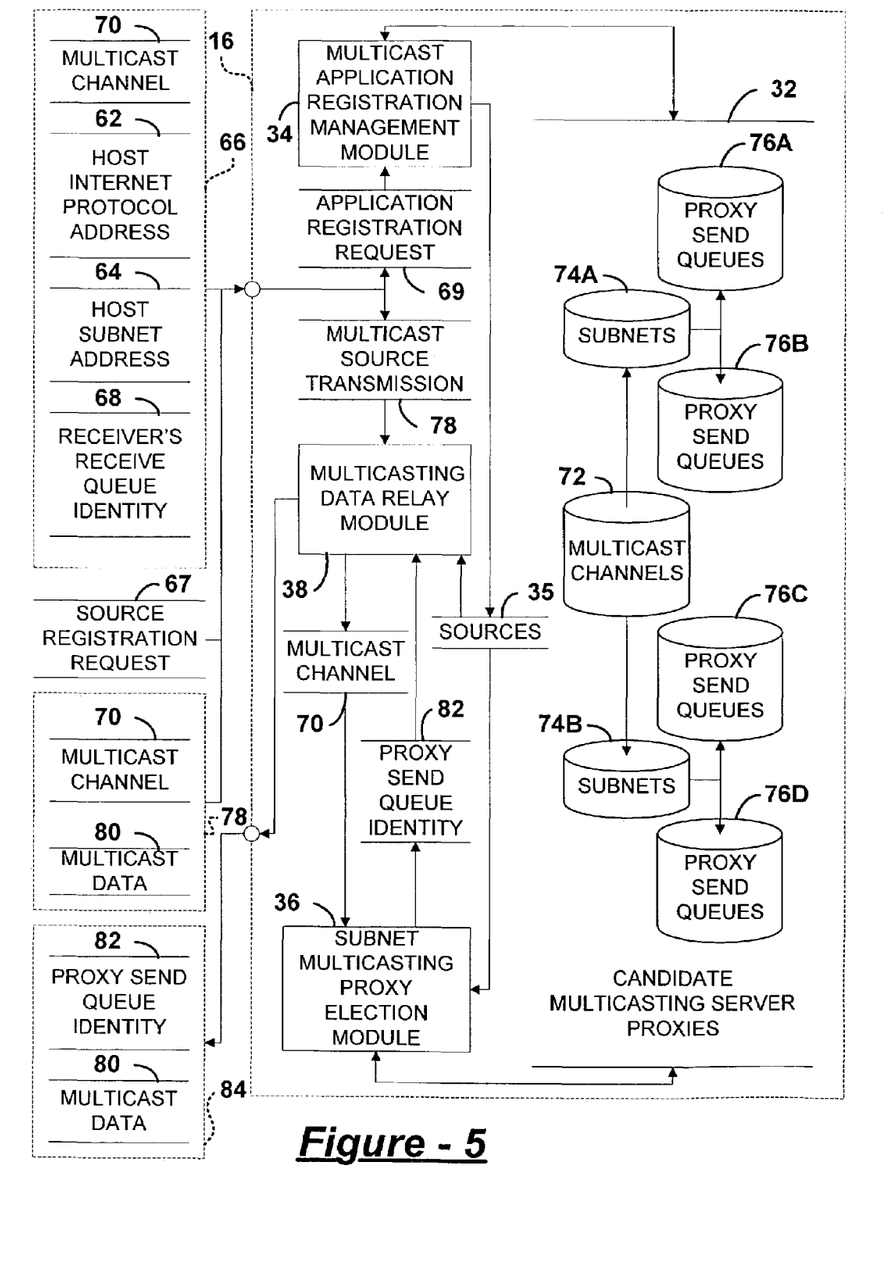
FIG. 5 is a block diagram illustrating an inter-subnet multicast relay service server in accordance with the present invention.

FIG. 5 illustrates the operation of the IMRS server 16 receiving registration request 66 and source registration request 67 as at request 69. For example, multicast application registration management module 34 is adapted to place the receiver's receive queue identity in candidate multicasting server proxy datastore 32 as a proxy send queue in association with the subnet in which it resides, which is identified by host subnet address 64, and the multicasting channel 70 it wishes to receive. Thus, a multicasting channel datastore 72 relates a plurality of subnets in a subnet datastore 74A-74B to a particular multicasting channel, which in turn relate a plurality of proxy send queues 76A-76D to particular subnets. For example, datastore 32 may correspond to a hash table having multicasting channels at a first level, subnets at a second level, and proxy send queues at a third level. One skilled in the art will recognize that other implementations are possible that may vary the operation of server 16 in one or more ways. For example, the hash table implementation renders it likely that an elected proxy will only receive on its receive queue multicast data which it has requested. Other implementations, such as shared vectors, may result in an elected proxy receiving all multicast data for a subnet, regardless of which multicast channel it wishes to receive. These alternative implementations should be considered within the scope of the present invention.

When server 16 receives a transmission from a multicasting server (not shown) registered as a source in datastore 35, wherein the transmission includes multicasting data 80 specifying the multicast channel 70, then subnet multicasting proxy election module 36 may access data store 32 based on the multicast channel 70 and retrieve one proxy send queue registered to each subnet registered to the multicasting channel 70. It should be readily understood that transmission 70 may specify additional multicasting channels which will result in retrieval of additional send proxy send queues for those channels. The multicasting data relay module assembles a unicast transmission 84 of the multicast data 80 for each retrieved proxy send queue identity 82 and routes the transmission 84 to application receive queue 60 (FIG. 4) utilizing the proxy send queue identity 82.

Interface 40 adapts application 42 to listen at designated receive queue 60, unpack transmission 84, and multicast the multicast data 80 received on the receive queue 60 on the subnet within which it resides. The multicast data 80 is thus output to the multicast address 52 for the subnet, and all of the receiving applications on the subnet, including application 42, are adapted to listen at the multicast address 52 and therefore receive the multicast data 80. It should be readily understood that interface 40 may be alternatively adapted to allow application 42 to stop listening at address 52 when transmission 84 is received on queue 60, and simply to utilize the data 80 that it also multicasts on address 52.

When application 42 leaves the session, it may be adapted by virtue of interface 40 to issue an end leave (not shown) to relay module 38 (FIG. 4). In turn, relay module 38 may be adapted to throw an exception (not shown) to subnet multicasting proxy election module 36. In turn, the session module 36 may be adapted to remove the related proxy send queue from datastore 32 and elect a new proxy for the subnet from those available, if any. It should be readily understood that application 42 may alternatively be adapted to leave a session silently, and that connections may be disconnected involuntarily. Thus, module 36 may be alternatively or additionally adapted to detect disconnection via the MQS, and throw an exception resulting in equivalent update procedures. If no candidate proxies for the subnet are then available, then module 36 is adapted to remove the subnet from the multicasting channel. Further, if no subnets remain for the channel, then module 36 is adapted to remove the channel. As a result, either a new proxy send queue identity for the subnet 82, a channel removal indicator, or a null value are returned to relay module 38. In response, relay module may be adapted to either continue relaying the multicast data 80 to the newly elected proxy, or to inform the multicasting server that no subscribers to the channel remain as appropriate. The new proxy for the subnet, which has been listening to the multicasting address and the designated receive queue, merely begins multicasting the multicast data as it is received. The result is dynamic provision of multicast server proxies according to application need without requiring permanent establishment of dedicated proxies in various subnets.

Figure 6:
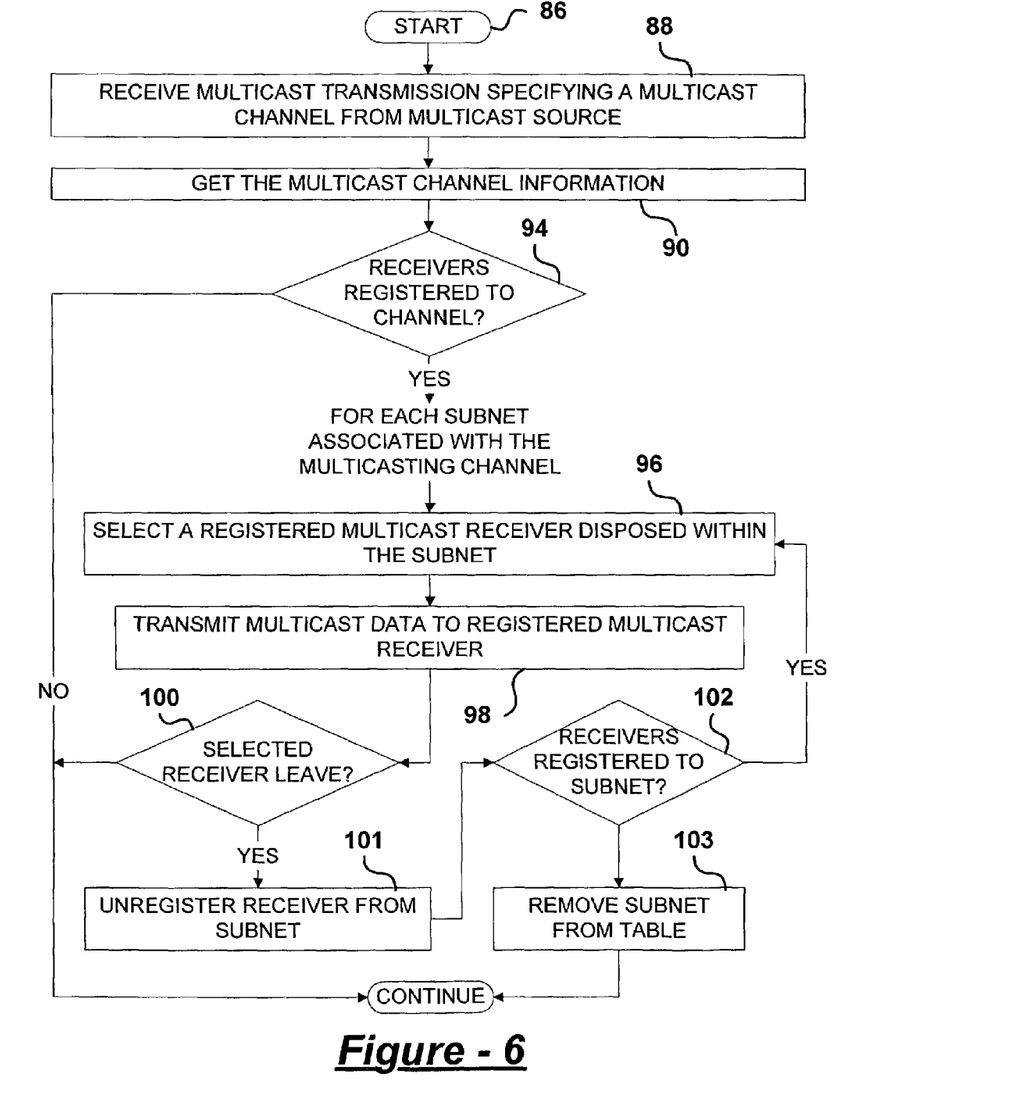
FIG. 6 is a flow diagram illustrating a server-side multicast relay method in accordance with the present invention.

FIG. 6 illustrates a relay server-side multicast relay method in accordance with the present invention. The relay method assumes that candidate multicasting server proxies are being added by a second process performed in parallel with the relay method. Beginning at 86, the method includes receiving a multicast transmission specifying a multicast channel from a multicast source at step 88. This step may include receiving a unicast directly from the source, receiving a multicast or broadcast transmission at a multicast or broadcast address, and/or receiving the transmission through a relay mechanism instead of from the original source. The multicast channel specifies the multicast address and the user datagram port, and the method includes getting the multicast channel information at step 90. The method further includes determining at 94 whether any receivers are registered to the channel of the multicast transmission received in step 88. If so, then a registered multicast receiver is selected for each subnet associated with the channel at step 96, and the multicast data is transmitted to each selected receiver at step 98. This transmission continues until it is determined at 100 that a selected receiver has left the session. In such case, processing for that subnet proceeds to step 101, wherein the receiver is unregistered from the subnet. Then, if more receivers are registered to the subnet as at 102, then processing for the subnet returns to step 96, and a new receiver is selected and utilized according to steps 98-102. If it is determined that no receiver is registered to the subnet at 102, then the subnet is removed from the table as being in association with the channel. If at any time no receivers are deemed registered to the channel as at 94, then the method may further include notifying the multicasting source and/or multicasting session management system for the source of the multicasting transmission.

Figure 7:
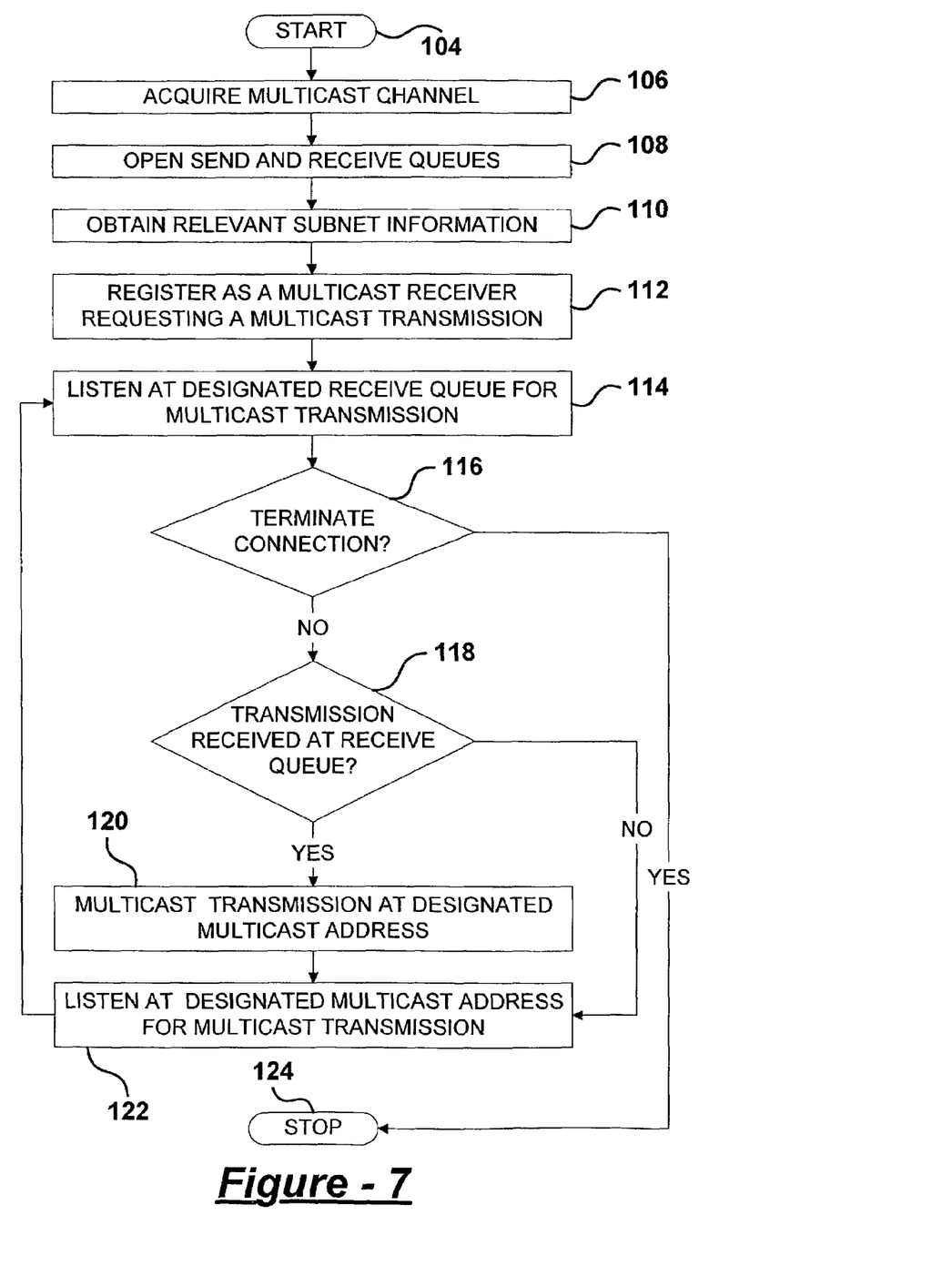
FIG. 7 is a flow diagram illustrating a receiver-side multicasting server proxy method in accordance with the present invention.

FIG. 7 illustrates a receiver-side multicasting server proxy method in accordance with the present invention. Beginning at 104, the method includes acquiring a multicast channel from a multicasting session management server or other source of multicast channels at step 106. The method also includes opening a receive queue designated for receiving a unicast of multicast data from a multicast relay service at step 108. The method further includes obtaining relevant subnet information, such as host subnet and/or IP address, for transmission to the IMRS server in step 112 to accomplish registration as a multicast receiver for a subnet and multicasting channel. The method still further includes listening at the designated receive queue for the multicast transmission, and, if the connection is not terminated at 116 and the transmission is received at 118, then the method includes multicasting on the multicasting channel at step 120 any transmission received on the designated receive queue. The method further includes listening at the multicast address of the multicast channel at step 122, whether or not the transmission is received at the receive queue. It should also be understood that step 122 can alternatively be dependent on whether the transmission is received at 118, such that the address is not listened at when the transmission is received at the receive queue. However, the method includes substantially simultaneously listening at the receive queue and the designated receive queue whenever multicast data is not received on the receive queue. If the connection is terminated at 116, then the method ends at 124, and/or the method includes communicating an end leave notification to the IMRS server.

The description of the invention is merely exemplary in nature and, thus, variations that do not depart from the gist of the invention are intended to be within the scope of the invention. For example, the receiving application program interface in accordance with the present invention may be adapted to selectively allow the receiving application to deliver data received from the relay server directly to the application without transmitting the data via multicast for dialup or any other case that covers a single receiver in a subnet. This shortcut mode provides improved efficiency in such cases and also handles cases where multicasting is not feasible, as with dialup. Also, a sending multicasting application may be adapted to perform the basic functions of a relay service, including registering and electing receivers disposed in various subnets, and unicasting the multicast data to the elected proxies. Further, receiving multicasting applications may be adapted to register with a sending multicasting application rather than a third party provider, in which case the sending application may be considered a relay service. Such variations are not to be regarded as a departure from the spirit and scope of the invention.

What is claimed is:

1. A multicast relay system for use in a wide area network, comprising:

an input receptive of multicast data specifying a multicast channel having a multicast address;

a registration datastore of candidate multicasting server proxies including multicast receivers hierarchically related to subnets and multicasting channels;

a proxy election module adapted to elect a multicasting server proxy disposed within a subnet associated in memory with the multicast channel, wherein the multicasting server proxy is adapted to receive the multicast data and multicast the multicast data on the multicast address within the subnet; and a multicast data relay module adapted to transmit the multicast data to the multicasting server proxy.

2. The system of claim 1, comprising a registration management module adapted to register a multicasting source.

3. The system of claim 1, comprising a registration management module adapted to register a multicast receiver as a candidate multicasting server proxy.

4. The system of claim 3, wherein said registration module is adapted to receive a registration request specifying a multicast channel, a subnet, and a receive queue, and to record a send queue corresponding to the receive queue in memory in association with the subnet and the multicast channel.

5. The system of claim 1, comprising an application program interface adapted to register the multicast receiver as a candidate multicasting server proxy associated with the subnet within which the multicasting receiver resides.

6. The system of claim 5, wherein a multicasting server is adapted to unicast the multicast data specifying the multicast channel to said input.

7. The system of claim 6, wherein said multicasting server is adapted to multicast the multicast data within a subnet within which it resides, and said proxy election module is adapted not to elect a multicasting server proxy residing within the subnet within which said multicasting server resides.

8. The system of claim 1, wherein said multicast data relay module is adapted to determine whether the multicasting server proxy has left the multicasting session.

9. The system of claim 1, wherein said proxy election module is adapted to elect a new multicasting server proxy related to the subnet and the multicast channel when the multicasting server proxy leaves the multicasting session, and to designate the new multicasting server proxy as the multicasting server proxy.

10. The system of claim 1, wherein the multicasting server proxy is adapted to listen substantially simultaneously at a receive queue and at the designated multicast address.

11. The system of claim 1, wherein multiple multicast receivers within the subnet are adapted to listen substantially simultaneously at designated receive queues and at the multicast address, and to multicast any multicast data received on a designated receive queue on the multicast address within the subnet.

12. The system of claim 1, further comprising a message queue subsystem providing buffering, connection maintenance, and communications functionality between said multicasting relay system and multicasting applications.

13. The system of claim 1, wherein said datastore is a hierarchical data structure having multicasting channels at a first level, subnets at a second level, and proxy send queues at a third level.

14. The system of claim 13, wherein said hierarchical data structure is a hash table.

15. A multicast relay method for use in a wide area network, comprising:
maintaining a registration datastore of candidate multicasting server proxies including multicast receivers hierarchically related to subnets and multicasting channels, including registering a multicast receiver as a candidate multicasting server proxy;
electing a multicasting server proxy disposed within a subnet associated in memory with a multicast channel, wherein the multicasting server proxy is adapted to receive the multicast data and multicast the multicast data on a multicast address of the multicast channel within the subnet; and
transmitting the multicast data to the multicasting server proxy.

16. The method of claim 15, comprising registering a multicasting source.

17. The method of claim 15, comprising receiving multicast data specifying the multicast channel having the multicast address.

18. The method of claim 15, comprising:
receiving a registration request specifying a multicast channel, a subnet, and a receive queue; and
recording a send queue corresponding to the receive queue in memory in association with the subnet and the multicast channel.

19. The method of claim 15, comprising providing an application program interface adapted to cause a receiving multicasting application to register as a candidate multicasting server proxy associated with the subnet within which the host of the receiving multicasting application resides.

20. The method of claim 19, comprising providing an application program interface adapted to cause the receiving multicasting application to listen substantially simultaneously at a designated receive queue and at the designated multicast address.

21. The method of claim 20, comprising providing an application program interface adapted to cause the receiving multicasting application to multicast within a subnet within which the host of the receiving application resides any multicast data received on the designated receive queue, and to use the multicast address when multicasting the multicast data within the subnet.

22. The method of claim 15, comprising determining whether the multicasting server proxy has left the multicasting session.

23. The method of claim 15, comprising:
electing a new multicasting server proxy related to the subnet and the multicast channel when the multicasting server proxy leaves the multicasting session; and
designating the new multicasting server proxy as the multicasting server proxy.

24. A multicasting server proxy for use with a multicast relay service, comprising:
a multicast receiver residing within a subnet;
a listener of the multicast receiver adapted to substantially simultaneously listen at a receive queue designated to receive multicast data and a multicast address associated with a multicast channel; and
a receiving application program interface adapted to cause said multicast receiver to multicast data received on the receive queue on the multicast address within the subnet, wherein said receiving application program interface is adapted to register said multicast receiver as a candidate multicasting server proxy hierarchically related to the subnet and the multicast channel.

25. The proxy of claim 24, wherein said receiving application program interface is adapted to selectively allow the receiving application to deliver data received on the receive queue directly to the application without multicasting the data on the multicast address within the subnet when no other receiving applications exist in the subnet.

26. A sending/receiving multicasting application program interface, comprising:
registering means for communicating a source registration request to a multicasting relay server having a registration datastore of candidate multicasting server proxies including multicast receivers hierarchically related to subnets and multicasting channels;
multicasting means for multicasting media content on a multicasting channel within which a host resides; and unicasting means for unicasting the media content and the multicasting channel to the multicasting relay server.

27. An inter-subnet multicast relay service for use in a wide area network, comprising:
- a multicasting server having multicast data and adapted to transmit the multicast data specifying a multicast channel to an inter-subnet multicast relay service server;
- a plurality of multicast receivers adapted to register with an inter-subnet multicast relay service server as candidate multicasting server proxies relating to subnets within which they reside and multicasting channels to which they listen, to listen substantially simultaneously at designated receive queues and multicasting channels, and to multicast any data received on a designated receive queue on the multicast channel within their respective subnets; and
- said inter-subnet multicast relay service server adapted to register said plurality of multicast receivers in a registration datastore of candidate multicasting server proxies including multicast receivers hierarchically related to subnets and multicasting channels, to receive the multicast data from said multicasting server, to elect a multicasting server proxy residing in a subnet associated with the multicast channel specified by the multicast data, and to transmit the multicast data to a send queue of the multicasting server proxy corresponding to a receive queue of one of said plurality of multicast receivers, thereby causing the multicast data to be multicast within the subnet.

* * * * *